Jan. 7, 1964 E. P. MOSLO 3,116,877
CORE RODS FOR BOTTLE BLOWING MACHINE
Original Filed Dec. 23, 1960 4 Sheets-Sheet 1

INVENTOR.
ERNEST P. MOSLO
BY
Mayer, Baldwin, Doran & Egan
ATTORNEYS

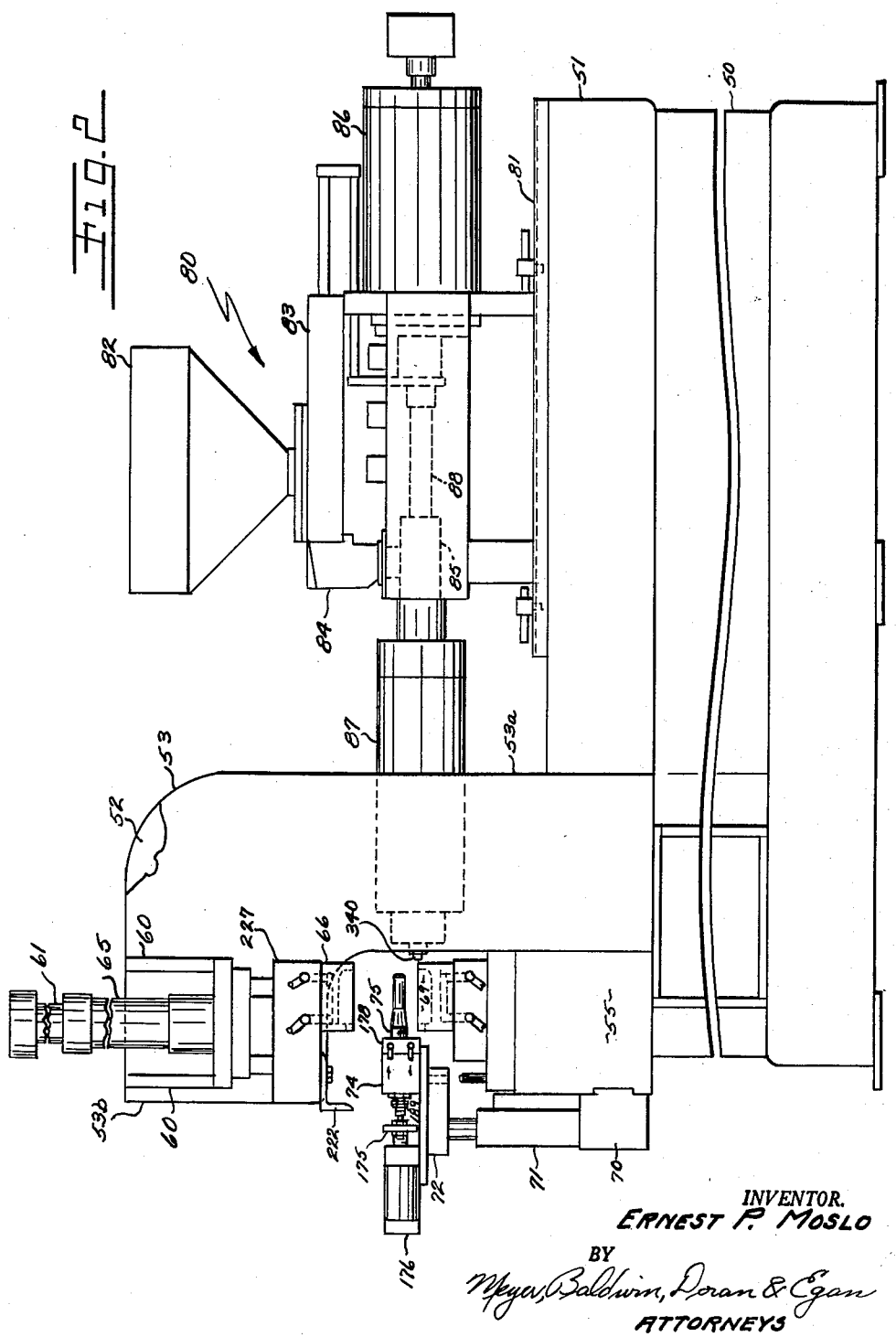

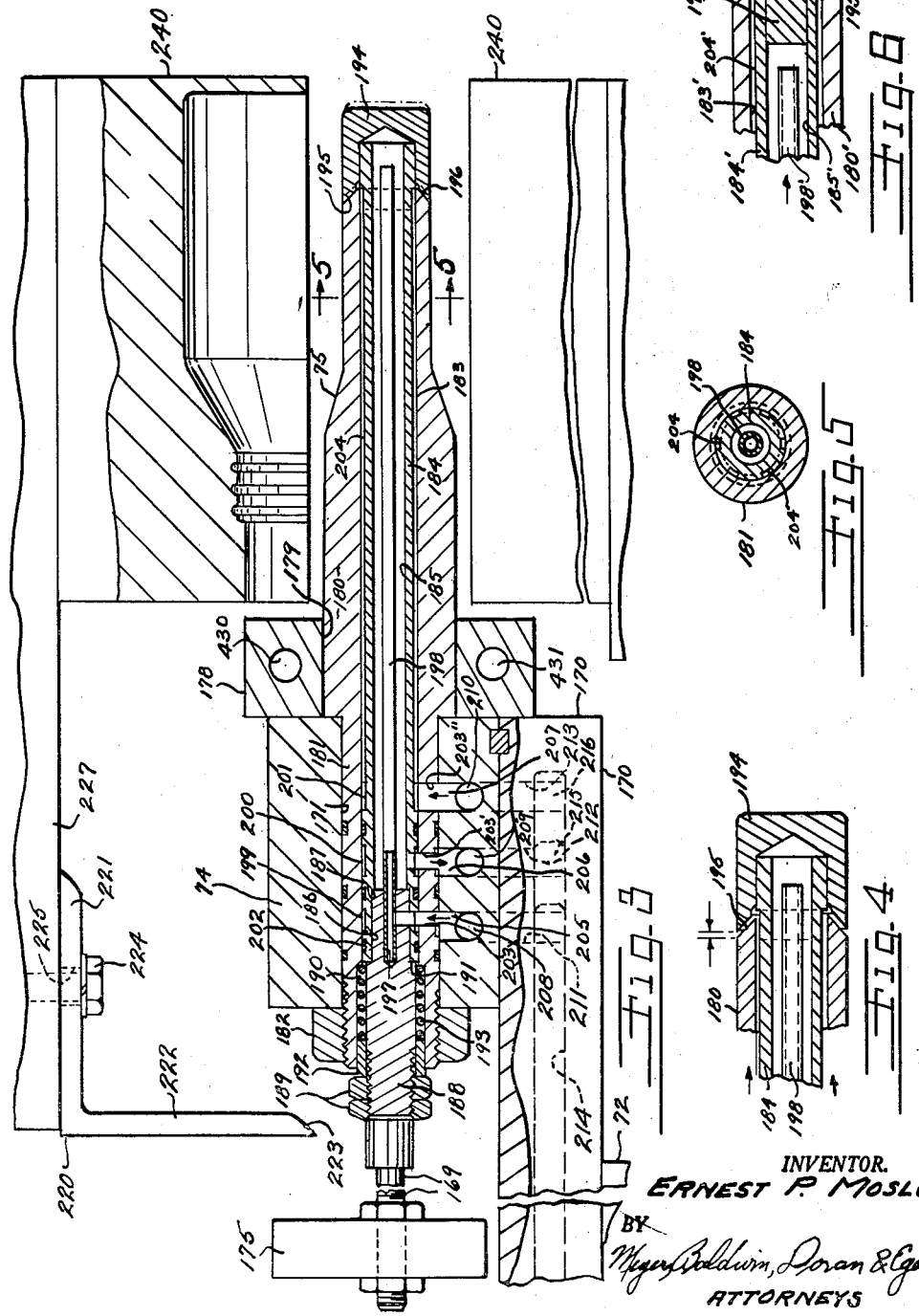

Jan. 7, 1964  E. P. MOSLO  3,116,877
CORE RODS FOR BOTTLE BLOWING MACHINE
Original Filed Dec. 23, 1960  4 Sheets-Sheet 4
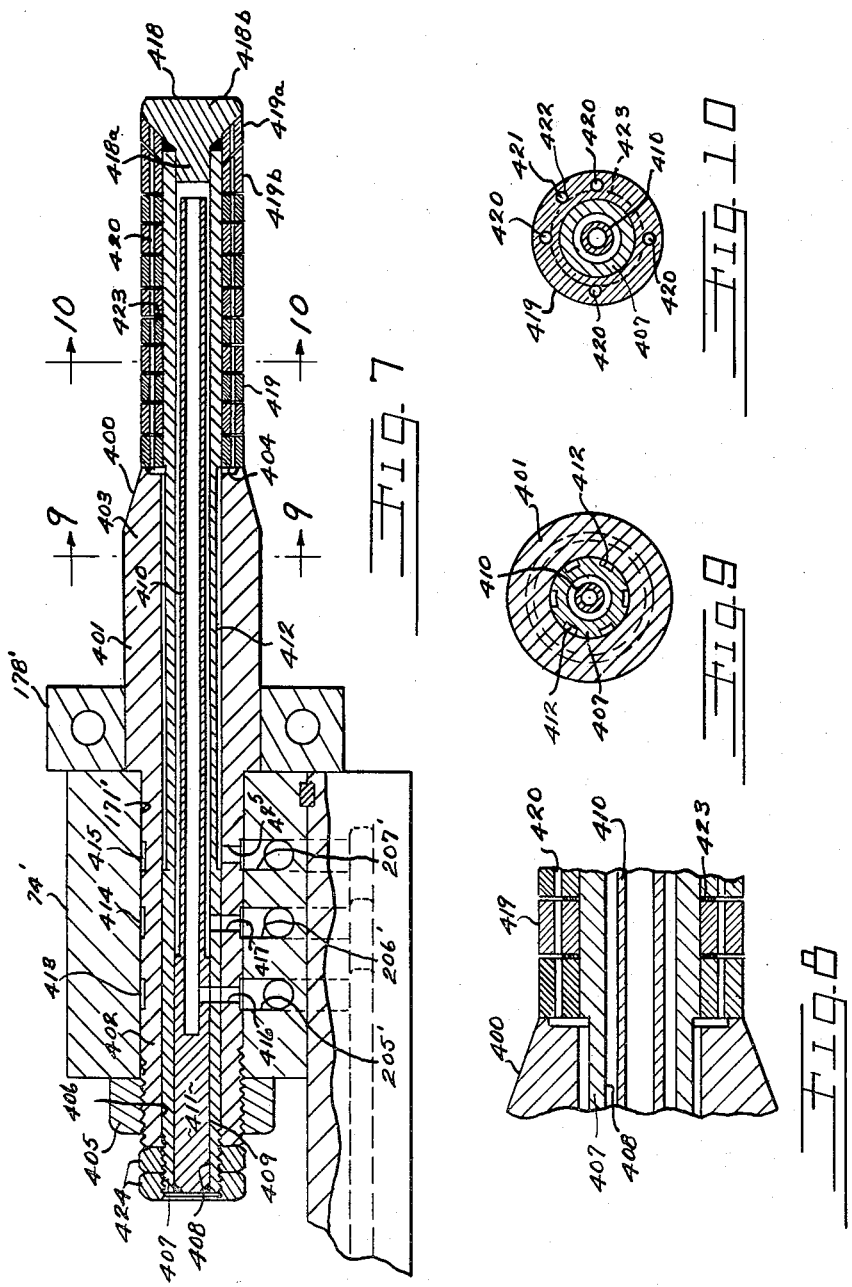
INVENTOR.
ERNEST P. MOSLO
BY
Meyer, Baldwin, Doran & Egan
ATTORNEYS United States Patent Office 3,116,877
Patented Jan. 7, 1964

3,116,877
CORE RODS FOR BOTTLE BLOWING MACHINE
Ernest P. Moslo, 2443 Prospect Ave., Cleveland, Ohio
Original application Dec. 23, 1960, Ser. No. 78,100.
Divided and this application Aug. 29, 1961, Ser. No. 134,614
5 Claims. (Cl. 239—132)

This invention relates generally to the art of forming hollow objects out of thermoplastic materials such as polyethylene, or vinyl. More particularly it relates to parison core rods for use in a machine for making bottles or similar articles by the method of inflating a preformed parison of flowable plastic inside a hollow mold of desired shape whereby the plastic is forced outwardly in every direction until it conforms to the mold walls. This application is a division of my copending application Serial No. 78,100 filed December 23, 1960, and reference is made thereto for a more complete disclosure of one specific blow molding machine with which the core rods of this invention may be used.

It is a general object of this invention to provide an improved core rod means for a blow molding machine or a similar apparatus.

A further object of the invention is to provide a core rod of the above type having means for controlling the temperature of the rod throughout its entire length.

Another object of the invention is to provide a core rod having the above characteristics and including means for introducing pressurized fluid into a parison molded upon the rod for forming the parison into a hollow article within a closed mold and means for exhausting the pressure from the formed article before the mold is opened.

Further objects of the invention and a number of its advantages will be apparent from the following description of two embodiments thereof, reference being made throughout to the accompanying drawings in which:

FIG. 2 is a side elevation of the machine as shown in FIG. 1;

FIG. 3 is an enlarged longitudinal section of the first embodiment of the core rod of this invention and a blow mold associated therewith;

FIG. 4 is a detail sectional view of the end of the core rod of FIG. 3 further enlarged and showing it in another position;

FIG. 5 is a transverse section taken along the line 5—5 of FIG. 3;

FIG. 6 is a view similar to FIG. 4 showing a modified end portion of a similar core rod;

FIG. 7 is a view similar to FIG. 3 showing another embodiment of the core rod;

FIG. 8 is an enlarged detail of a mid portion of the core rod as shown in FIG. 7;

FIG. 9 is a transverse section taken along the line 9—9 of FIG. 7; and

FIG. 10 is a transverse section taken along the line 10—10 of FIG. 7.

Figure 1:
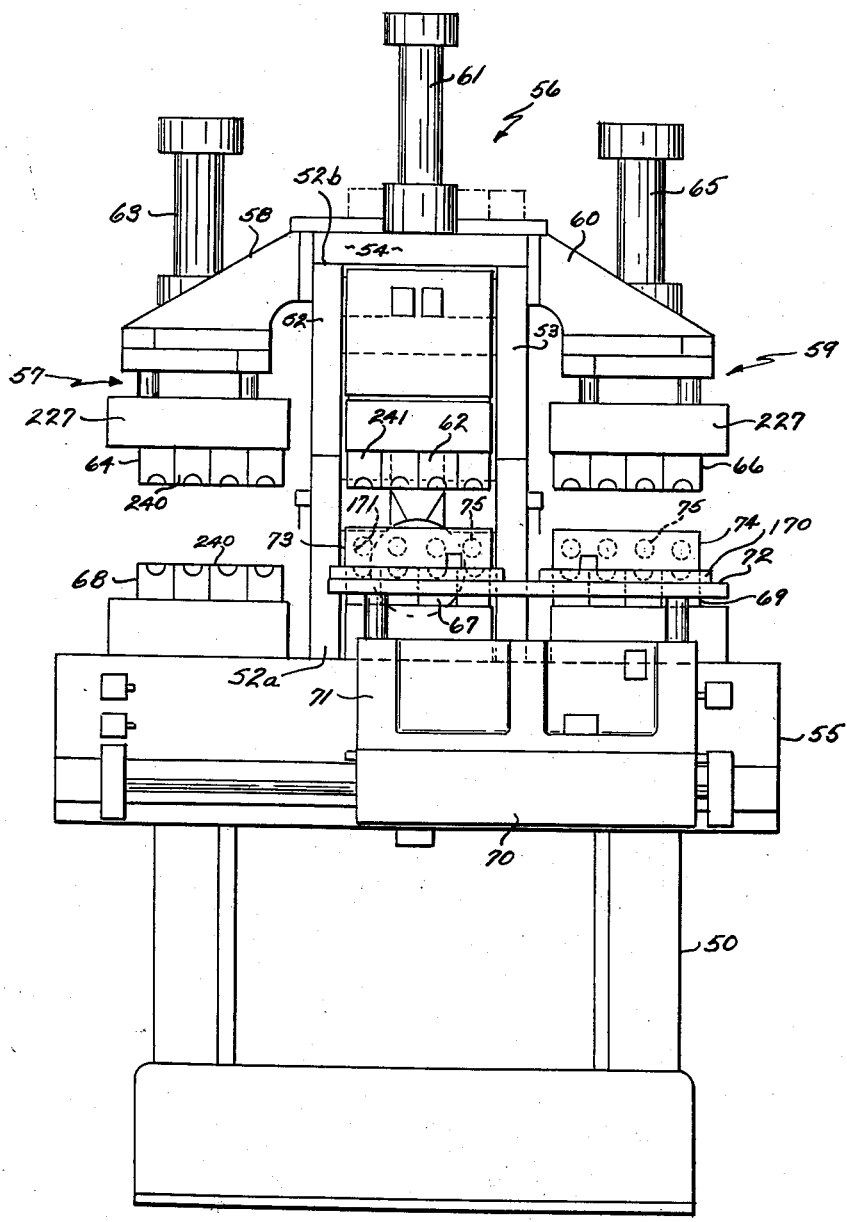
FIG. 1 is a front elevation of a bottle blowing machine with which the core rod of this invention may be used.

The core rods of this invention are herein illustrated in connection with a blow molding machine as disclosed in the above referred to original application. It will be understood that the molding machine is shown by way of example only of one apparatus with which the core rods disclosed herein may be used and is not intended as a limitation of the present invention.

Basically, the blow molding machine comprises three molds with corresponding mold clamps positioned side-by-side and two unitarily mounted groups of parison core rods adapted to be selectively disposed within adjacent pairs of the molds. The groups of core rods are mounted upon a vertically movable and laterally shiftable table and extend horizontally outwardly into the area of the molds whereby when the molds are closed, the core rods are disposed therein. Each mold comprises a plurality of individual mold units corresponding to the number of core rods in each group. The central mold is adapted for the injection molding of parisons upon the core rods, and the side molds are adapted for blow molding the finished articles.

Injection means is provided adjacent the parison mold for plasticizing granular molding material of the type referred to and injecting it into the closed molds to form the parisons upon, for example, a first group of core rods. Concurrently with the injection of the plastic, air is introduced under pressure through the second or remaining group of core rods disposed within one of the side molds whereby previously formed parisons thereon are blown into completed articles.

Subsequent to the above, the molds are opened by the clamps, all of the core rods are raised by the table, and the finished articles are ejected from the second group of core rods disposed adjacent the side mold. The table then shifts laterally whereby the first group of core rods with their newly formed parisons are transferred to the opposite side mold, this movement simultaneously disposing the second group of core rods in alignment with the parison molds. The core rods are then lowered, the molds are closed, and the above cycle is repeated; the parisons are injection molded upon the second group of core rods while the articles are blown by the first group of core rods, the clamps are opened, the core rods are raised and the newly blown articles are ejected.

Referring now to the drawings in which like parts are designated by like reference numerals, FIGS. 1 and 2 show, generally, a blow molding machine which comprises a supporting frame 50 upon which the various operating elements of the machine are unitarily mounted. As well shown in FIG. 2, the frame 50 supports a bed 51 adjacent the rear of the machine in front of which is provided a pair of upwardly projecting, forwardly extending, parallel mold clamp supporting members 52 and 53. The mold clamp supporting members are laterally spaced a uniform distance on either side of the center line of the machine and are rigidly connected adjacent the upper ends thereof by means of a cross member or plate 54. The mold clamp supporting members 52 and 53 are of identical configuration having vertically upright portions 52a—53a and right angularly disposed, forwardly cantilevered portions 52b—53b. Adjacent the lowermost ends of the upright portions and directly beneath the forwardly cantilevered portions 52b—53b, there is provided a lower mold support base 55. The base 55 extends laterally across the front of the machine and extends in either lateral direction beyond the limits of the frame 50 as well shown in FIG. 1.

It will be understood that the bed 51, the mold clamp supporting members 52—53, and the lower mold support base 55 are all unitarily and solidly mounted upon the frame 50 in any suitable manner.

The forwardly projecting portions 52b and 53b provide mounting means for a parison mold clamp assembly 56 positioned therebetween. A left blow mold clamp assembly 57 is mounted upon the outer side of the supporting member 52 by means of laterally projecting brackets 58. In a similar manner, a right blow mold clamp assembly 59 is secured to the laterally facing, outer surface of the supporting member 53 by means of the brackets 60. The parison mold clamp assembly 56 includes a vertically reciprocably acting cylinder and piston motor 61 adapted to vertically move an upper parison mold half 62. In a similar manner, the mold clamp assemblies 57 and 59 include cylinder and piston motors 63 and 65 adapted to vertically move upper blow mold halves 64 and 66 respectively.

The support base 55 supports the lower mold halves beneath each of the mold clamp assemblies. The lower parison mold half is indicated at 67 and is fixedly secured in the center of the support base 55 to complementarily engage the upper parison mold half 62 when said upper mold half is lowered by means of the cylinder 61. In like manner, lower blow mold half 68 is fixedly secured to the base 55 beneath the upper blow mold half 64, and lower blow mold half 69 is rigidly mounted beneath the upper blow mold half 66.

A table shifting assembly 70 is mounted upon the forward face of the support base 55 and is adapted to reciprocate laterally between the position as shown in FIG. 1 wherein it is disposed generally beneath the parison mold and the right blow mold to a position whereby said assembly 70 would be positioned generally beneath said parison mold and the left blow mold. The table shifting assembly 70 supports and carries with it in its lateral movement a parison core rod holder assembly indicated at 71. The core rod holder assembly 71 comprises generally a vertically shiftable table 72 upon which are mounted a pair of laterally spaced core rod holders 73 and 74. As seen in FIG. 1, the core rod holder 73 is disposed on the left side of the table 72 whereas the other core rod holder 74 is disposed on the right side. In this position, core rods shown at 75 which are associated with the left core rod holder 73 are positioned between the parison mold halves 62, 67, and those core rods associated with the right core rod holder 74 are positioned between the right-hand blow mold halves 66 and 69. It will be understood that when the table shifting assembly 70 moves all the way to the left, the core rods of left-hand core rod holder 73 would be disposed between the blow mold halves 64, 68 while simultaneously the core rods of the right-hand holder 74 would be disposed between the parison mold halves 62, 67.

Referring now to FIG. 2 of the drawings, the bed 51 supports a material injection assembly which is generally indicated at 80. Said material injection assembly is adapted for movement toward and away from the lower parison mold half 67 by means of a slideway 81 which is securely mounted upon the upper surface of the bed 51. The material injection assembly 80 comprises a hopper 82 into which the molding material is initially placed in its granular state. A material feed mechanism 83 transfers the granular molding material in predetermined amounts forwardly to a funnel 84 from which it drops into a packing cylinder 85. Rearwardly of said packing cylinder there is provided an injection cylinder 86 having a forwardly and rearwardly reciprocating ram 88 adapted to propel the downcoming granular molding material in a forward direction into a material heating chamber or plasticizing head 87. The material heating chamber 87 is so positioned adjacent the parison molds and in communication with spaced nozzles 340 that when said parison molds are closed upon the core rods, parisons are injection molded upon said core rods by the material injection assembly.

It will be understood that the overall views of the machine of this invention as shown in FIGS. 1 and 2 are greatly simplified. Details of the core rods 75 of this invention are clearly shown in subsequent views which will be described and discussed in detail.

The core rod holders 73 and 74 are mounted upon a core rod base 170 which is in turn mounted upon the table 72. Each core rod holder comprises an elongated, rectangular block having a plurality of bores 171 therethrough. The core rod holders are positioned upon the core rod base 170 with their longer dimensions disposed parallel with the elngthwise dimension of said base. The bores 171, said bores as herein illustrated being four in number in each core rod holder, are disposed at right angles to the longer dimension of said core rod holders or parallel with the forward and rearward dimensions of the machine itself. Each bore 171 provides mounting means for one of the core rods 75 which is telescopically fitted within its corresponding bore.

As best shown in FIG. 3, each core rod 75 comprises a spindle 180 which is provided with a diametrically reduced portion 181 adapted to closely telescopically interfit one of the bores 171 of a core rod holder as indicated at 74. The reduced portion 181 extends completely through and beyond its associated core rod holder and is secured thereto against axial movement by means of a thread fitted nut 182. Said spindle extends toward the rear of the machine in the direction of the molds a sufficient distance to be embraced by said molds when the molds are in their closed position. The core rod 75 as illustrated in FIG. 3 is shown in association with an open blow mold unit indicated by the numeral 240 and comprising upper and lower complementary sections of the upper and lower mold halves respectively, the two recited sections adapted to be closed upon a single core rod to form an individual mold for a parison to be blown therein.

The spindle 180, at the portion thereof which enters the molds, may be of any preferred shape for forming the internal dimensions of a parison suitable for the particular article which is to be molded. As herein illustrated, the spindle is shaped for forming a parison for the purpose of blow molding a small size plastic baby bottle. It will be understood that the core rod of this invention is adaptable for making bottles of any desired shape by changing its external shape, the internal shape of the parison mold, and the internal shape of the associated blow molds.

The spindle 180 is provided with an axial bore 183 into which is slidably interfitted a valve stem 184. The valve stem 184 does not extend all the way through the spindle 180 but terminates within the area of the core rod holder block. Said valve stem is provided with an axial bore 185 which is diametrically outwardly stepped adjacent the end thereof disposed within the core rod holder as indicated at 186 thereby providing an internal shoulder at 187. A step retainer plug 188 is rigidly secured within the outwardly stepped bore 186 whereby the end of said plug abuts the shoulder 187. The retainer plug 188 extends outwardly beyond the forward end of the spindle 180 and is threaded to receive lock nuts 189.

The spindle 180 is also provided with a socket 190 which is coaxial with the spindle bore 183 and terminates in a shoulder 191. A spacer 192 is slidably telescoped over the retainer plug 188, abutting the lock nuts 189, and a coil spring 193 is compressively interposed between said spacer and the shoulder 191. It will be readily seen that the spring 193 urges the valve stem 184 in a forward direction or in the direction of the front of the machine.

The rearwardly directed end of the valve stem 184 is provided with a valve head 194 in the form of a caplike member which is telescoped over and rigidly fitted to the end of the valve stem thereby closing the stem at this point. The annular edge of the valve head 194 is provided with an inner bevel at 195 adapted to complementarily fit and coact with an outer bevel 196 of the rearwardly directed end of the spindle 180. The spring 193 normally holds the bevels 195 and 196 in abutting relation whereby the valve is closed, and opening of the valve is effected by axial pressure exerted in a rearward direction upon the retainer plug 188.

The retainer plug 188 has a socket 197 in the end thereof disposed within the valve stem 184, and a small tube 198 is seated within said socket. The tube 198 projects in the direction of the valve head 194 and terminates a short distance from the end of the valve stem 184. The tube 198 is radially spaced from the bore 185 of the valve stem 184.

The valve stem 184 is provided with three axially spaced, flat bottomed, circumferential grooves 199, 200 and 201 in the external surface of said valve stem within the area of the core rod holder. These grooves are sealed from each other by ring gaskets 202 which are seated within suitable external grooves in the valve stem 184.

A radial passageway 203 extends through the spindle 180, the valve stem 184, the retainer plug 188, and the tube 198 at the groove 199. A passage 203' extends radially through the spindle 180 and the valve stem 184 and connects with the axial bore 185 at the groove 200. A third radial passage 203" is provided at the groove 201 and extends through the spindle 180. The circumferential groove 201 in turn connects with a plurality of longitudinal grooves 204 which are spaced circumferentially around the valve stem 184 and extend along the valve stem to the area opposite the beveled surfaces 195—196.

The passages 203, 203', and 203" extend radially downwardly through the bottom of the spindle 180 and interconnect with passages 205, 206, and 207 respectively in the lower portion of the core rod holder. These latter passages interconnect respectively with horizontal passages 208, 209, and 210 which extend longitudinally through the core rod holder below the aforementioned passages 205–206–207. The horizontal passages 208–209–210 in turn respectively interconnect with passages 211, 212, and 213 which are vertically disposed and extend downwardly through the bottom of the core rod holder and into the core rod base 170. Horizontal passages 214, 215, and 216 extend from the forward edge of the base 170 and interconnect respectively with the vertical passages 211, 212, and 213. The passages 214, 215, and 216 are provided with suitable fluid connections at the forward edge of the core rod base 170 (not shown) whereby fluid is introduced into or exhausted from the core rod in a manner to be herein later fully described.

The passage 216 provides means for introducing air under pressure to be used for either blowing the bottle within the blow mold or to eject a blown bottle from the parison rod. It will be seen that the air passes through the passages 216, 213, 210, and 207 to the circumferential groove 201 and the longitudinal grooves 204 whereby it escapes from the parison rod when the valve head 194 is opened and the beveled surfaces 195—196 separate. The open position of the core rod valve is shown in FIG. 4, it being necessary to open the valve only a small distance to allow sufficient flow of air.

Passages 214 and 215 provide means for introducing to and discharging from the hollow core rods 75 a coolant, such as water. Water passes inwardly through the passages 214, 211, 208, 205, and through the tube 198 to the end of the spindle at which point the flow is reversed and passes through the axial bore 185 around the tube 198 to the passage 203' from which it is exhausted through passages 206, 209, 212, and 215. By controlling the temperature of the water which is passed through the core rod, said core rod is maintained at the desired temperature for injection molding a parison thereupon at the parison mold, and for controlling the parison in the desired condition for further processing in the machine.

After a bottle has been blown and before the blow mold is opened, it is necessary to exhaust the pressure inside the bottle to prevent the bottle from rupturing as soon as the blow molds are opened. To accomplish this there is provided mechanical means for holding the valve head 194 in the open position when the blow molds are closed and permitting the escape of air after the air pressure is turned off. This means comprises an angular plate 220 having a horizontal mounting portion 221 and a vertically downwardly directed cam portion 222 having a beveled cam surface 223 at its lower edge. The mounting portion 221 is bolted to a horizontally projecting mounting plate 227, to which the upper blow mold halves 64—66 are secured, by means of bolts 224 which project upwardly through slots 225 in said mounting portion, said bolts being thread fitted into the mounting plate 227. The slots 225 afford forward and rearward adjustment of the angular plate 220 whereby the cam portion 222 can be positioned in such manner that closing of the blow molds causes the cam surface 223 to abut the foremost nut 189 and cam the valve stem 184 rearwardly. This opens the valve head 194 and holds it open as long as the molds are closed. There is a separate plate 220 associated with each of the two blow mold clamp assemblies 57 and 59, and each said plate is of such length as to simultaneously actuate all four core rods 75 associated with either the left core rod holder 73 or the right core rod holder 74.

From the foregoing it will be understood that each time the blow molds are closed, all of the valves in the corresponding core rods 75 which are then associated with a closing blow mold are caused to be opened and are held open until the blow molds are opened. For the purpose of blowing the bottles, it is generally not necessary to open the core rod valves mechanically since a relatively high fluid pressure is used sufficient in itself to open the valves. But for the purpose of relieving the pressure in the newly formed bottles, such mechanical opening is important while the blow molds are closed. The valve means for directing air to the core rods allows exhaustion of the air when said valve means is deactivated.

As more fully detailed in my original application, hereinbefore referred to, air is directed to the core rods 75 under different pressures at different times during the manufacturing cycle. When a blow mold is closed upon core rods having parisons thereon, air is introduced through the core rods at a relatively high pressure for blowing the bottles after which such pressure is relieved back through said core rods, the valve heads 194 being held open for this purpose by a cam portion 222 of one of the angular plates 220 as above described. When the molds are opened after the bottles have been formed, air is again introduced through the core rods 75, this time at a relatively lower pressure sufficient to normally strip the bottles from the rods. However, as well shown in FIG. 6 of the original application, mechanical means is also provided for stripping the bottles, portions of such mechanical means being shown in FIGS. 2 and 3 of the present application.

Generally, the mechanical stripper means comprises a laterally disposed pusher bar 175 positioned in front of and spaced from the associated core rod holder and a stripper plate 178 which is positioned parallel with and normally contiguous the rearwardly directed face of said core rod holder. The pusher bar 175 and stripper plate 178 are connected together for unitary action by means of pusher rods 169 passing through suitable apertures in the core rod holder and the entire assembly is actuated for forward and rearward movement by means of a small cylinder and piston motor 176. The stripper plate 178 is provided with a plurality of apertures 179 through which the core rods 75 loosely project. Said stripper plate is adapted to be moved rearwardly by the motor 176 along the core rods to remove therefrom any articles or bottles not removed by the air.

It is also desirable that the core rod valves be mechanically opened during the stripping of the bottles from said core rods. This is effected by the pusher bar 175 which moves forwardly when the cylinder and piston motor 176 is actuated to a position whereby it abuts the foremost nuts 189 and simultaneously opens all of the valve heads 194 in the associated core rods. Thus it will be seen that the fully blown bottles are both pushed by the stripper plate 178 and blown free of the core rods by the operation of the pusher bar 175 during ejection of said bottles.

It is anticipated that the distal end of the core rod spindle of FIGS. 3 and 4 may be modified according to the showing as illustrated in FIG. 6. In FIG. 6, 184' represents the valve stem, and the water inlet tube is shown at 198' concentrically disposed within the axial bore 185' of said valve stem. The longitudinal grooves of the valve stem 184' are shown at 204' (spaced like grooves 204) and extend all the way to the end of said valve stem. The valve stem 184' is telescopically fitted within an axial bore 183' of the spindle 180'.

In the modification of FIG. 6, the distal end of the spindle 180' is provided with an inwardly converging bevel 196' adapted to complementarily interfit a bevel 195' of a valve head 194'. The valve head 194' is generally frusto-conical in shape and is provided with a forwardly projecting shank 194" which tightly seats within and interfits the axial bore 185'. The valve head 194' is rigidly secured and sealed to the end of the valve stem 184', preferably by welding or other suitable means.

It will be understood that the valve arrangement as shown in FIG. 6 operates in substantially the same manner as that hereinbefore described in connection with FIG. 3. Closing of the adjacent blow mold causes the cam portion 222 of the plate 220 to abut the foremost nut 189 which presses the valve stem 184' forwardly and separates the beveled surfaces 195' and 196'. Cooling of the core rod and the introduction of air thereto are the same as in the above mentioned FIG. 3.

FIGS. 7 to 10 inclusive illustrate a completely modified form of a core rod which may be used with a machine of the type herein illustrated and described. Certain parts as shown in the modified form are identical with the first form of the core rods, and where such parts are identical, they are given the same reference numeral as in the first form except that said numeral is primed. The modified core rod is indicated at 400 and is mounted at the proximal end thereof in a core rod holder 74' which is identical with the core rod holder 74. The core rod holder 74' is bored at 171' whereby it is adapted to telescopically receive a reduced portion 402 of a spindle 401. Said spindle 401 terminates in a rearward direction intermediate the ends of the core rod 400 and is provided with a circular recess 404 in the rearwardly directed end thereof. The forwardly directed end of the spindle is provided with a clamping nut 405 thread fitted thereupon to hold said spindle securely within the core rod holder 74'. A stripper plate 178' is telescopically fitted over the spindle 401 adjacent the core rod holder 74' and functions in the same manner as the stripper plate 178 of the first embodiment.

Said spindle has a longitudinal bore 406 which telescopically receives a water jacket 407. The water jacket 407 replaces the valve stem 184 of the first embodiment and is fixedly mounted within the spindle bore 406. The water jacket 407 is in turn coaxially bored at 408 and has mounted therein a water injection member 409. Said water injection member comprises a tubular portion 410 of substantially smaller diameter than the water jacket bore 408 and a solid end portion 411 which completely seals the forwardly directed end of the water jacket 407. The water jacket 407 extends rearwardly substantially beyond the distal end of the spindle 401, and the tubular portion 410 of the water injection member 409 terminates within said water jacket a short distance from the end thereof. The water jacket 407 is also provided with a plurality of circumferentially spaced, longitudinally disposed grooves 412 in its outer surface which extend from an air inlet passage 207' along the water jacket and intersect the annular recess 404 in the end of the spindle 401. Water inlet passage 205' and water outlet passage 206' are also provided in the core rod holder 74' in the same manner and for the same purposes as that shown in the first embodiment of FIG. 3.

From the foregoing it will be understood that the core rods 75 and 400 are readily interchangeable in either the core rod holder 74 or 74' since core rod holders are identical in construction. However, when core rods 400 are used, the angular plates 220 become unnecessary.

Circumferentially continuous, flat bottom grooves 413, 414, and 415 are provided in the outer surface of the reduced portion 402 of the spindle 401 in respective alignment with the water inlet passage 205', the water outlet passage 206', and the air passage 207'. Radial passage 416 extends inwardly from the groove 413 to the interior of the water injection member 409 whereby a temperature regulating fluid is introduced into said water injection member. The water flows toward the open end of the tubular portion 410 at which point it reverses direction flowing along the outside of said tubular member to be exhausted through radial passage 417 which connects the water jacket bore 408 with the groove 414. The distal end of the water jacket 407 is completely sealed by a plug 418 welded or otherwise suitably secured in the end thereof.

The plug 418 has a cylindrical shank 418a which is seated within the end of the water jacket 407 and an outwardly flared, frusto-conical retainer portion 418b. The plug 418 is welded or otherwise suitably secured in place to the water jacket 407 whereby the end of said water jacket is completely sealed.

A plurality of sleevelike segments 419 are telescopically fitted over the water jacket 407 and are interposed between the retainer portion 418b and the spindle 401. All of the segments 419 are of the same cross sectional shape as seen from line 10—10 with the two segments designated 419a and 419b adjacent the plug 418 having beveled edge surfaces of the same angle as those of the retainer portion 418b. The segment 419a has parallel beveled surfaces at either axial end of said segment, and the segment 419b is beveled at the end thereof adjacent the segment 419a. All of the other segments 419 have end surfaces perpendicular with the axis of said segment.

As best shown in FIG. 10, each segment is provided with a plurality of apertures 420 which extend through the walls of the segment axially parallel with the segment axis. The apertures 420 are circumferentially evenly spaced 90 degrees apart on the segment. An aperture 421 is also provided in each segment, said aperture 421 being spaced intermediate two of the apertures 420. The aperture 421 is adapted to receive a thin rod 422 which is passed through all of the segments in such manner as to hold all of the apertures 420 of all of the segments in coaxial alignment. The resulting structure provides four continuous passages which extend from the recess 404 to the beveled surface of the retainer portion 418b of the plug 418.

Relatively thin washers 423 are interposed between each pair of adjacent segments. Said washers are of such outer diameter that the outer peripheries thereof are just inside the apertures 420. From the apertures 420 outwardly the segments 419 are, therefore, axially spaced from each other a distance equal to the thickness of the washers 423. The entire assembly is rigidly held together by means of jam nuts 424 which are thread fitted upon the forwardly directed end of the water jacket 407 thereby pulling the retainer portion 418b of the plug 418 tightly against all of the segments.

It will be clearly seen that air entering through the passage 207', which intersects the circumferential groove 415 by means of a radial passage 425, can pass along the grooves 412 in water jacket 407 to the recess 404 from which point it will be distributed through the segments 419 by means of the apertures 420. From the segments the air escapes radially outwardly through the spaces between the segments 419. It has been found that if the washers 423 are sufficiently thin, for example about .001 inch thick, plastic which is injection molded upon the core rod will not pass inwardly between the segments. The thickness of the washers or the number used can, of course, be varied.

Air which is directed through the interstices between the segments is used to eject or blow mold the bottle in the usual manner as hereinbefore set forth. This embodiment of FIG. 7 has the advantage that no valve operating mechanism such as the pusher bar 175 or the valve actuating cam 223 are necessary since air is introduced or the pressure within a newly blown bottle is automatically relieved through the spaces between the segments when the air actuating valve is actuated or is in a neutral or exhaust position.

It will be understood that many changes in the details of the invention as herein described and illustrated may be made without, however, departing from the spirit thereof or the scope of the appended claims.

What is claimed is:

1. A core rod for a blow molding machine comprising a hollow spindle having a mounting end and a distal end; a tubular water jacket interfitting said spindle and extending beyond said distal end; a plug member sealing the distal end of said water jacket; a tube disposed inside said water jacket in spaced relation with the inner peripheral surface thereof and terminating adjacent but spaced from said plug whereby a fluid medium injected into said tube adjacent said mounting end returns to said mounting end through said water jacket; said spindle and said tubular member having interfitting surfaces, one of which affords air passage means from said mounting end through to said distal end of said spindle; air ejection means telescoped over said water jacket between the distal end of said spindle and said plug; said air ejection means affording longitudinal passage means communicating with said air passage means, and having longitudinally spaced, laterally directed, interstices for escape of air introduced through said air passage means.

2. A core rod as set forth in claim 1 wherein the recited air ejection means comprises a plurality of ring-like segments telescoped over said water jacket in stacked relation; each segment having a plurality of apertures aligned with the apertures of the other segments and disposed intermediate the inner and outer peripheries of said segments parallel with the segment axis; and spacer means disposed between said segments radially inwardly from the apertures.

3. A core rod as set forth in claim 2 wherein the recited spacer means are of such thickness as to space said segments approximately .001 inch apart, the spaces between said segments communicating with said longitudinal passage means for escape of air therethrough.

4. A core rod as set forth in claim 2 including a rod projecting through one aperture in each segment whereby the apertures in each segment are respectively aligned with the apertures in all segments.

5. A core rod for a blow molding machine comprising a hollow spindle having a mounting end and a distal end; a tubular water jacket disposed within and interfitting said spindle and extending outwardly beyond said distal end; closure means closing the outer end of said jacket; a tube disposed inside said water jacket in spaced relation to the inner peripheral surface thereof and terminating adjacent to but spaced from said closure means whereby a fluid medium injected into said tube adjacent to said mounting end returns to said mounting end through said water jacket; said spindle and said tubular member having interfitting surfaces, one of which affords air passage means from said mounting end through to said distal end of said spindle; air ejection means telescoped over said water jacket between the distal end of said spindle and said closure means; said air ejection means affording longitudinal passage means communicating with said air passage means; said air ejection means affording longitudinally spaced, circumferentially directed, fixed openings for escape of air introduced through said air passage means.

References Cited in the file of this patent
UNITED STATES PATENTS

| | | |
|---|---|---|
| 2,298,716 | Moreland et al. | Oct. 13, 1942 |
| 3,011,216 | Gussoni | Dec. 5, 1961 |

FOREIGN PATENTS

| | | |
|---|---|---|
| 154,343 | Australia | Nov. 27, 1953 |
| 563,595 | Belgium | Jan. 15, 1958 |